United States Patent
Wang et al.

(10) Patent No.: US 8,750,697 B2
(45) Date of Patent: Jun. 10, 2014

(54) OPTICAL IMAGE STABILIZER OF CAMERA

(75) Inventors: Ya-Ling Wang, Taichung (TW); Ting-Rung Hsu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/108,772

(22) Filed: May 16, 2011

(65) Prior Publication Data

US 2012/0188643 A1 Jul. 26, 2012

(30) Foreign Application Priority Data

Jan. 20, 2011 (TW) .............................. 100102188 A

(51) Int. Cl.
*G03B 17/00* (2006.01)
(52) U.S. Cl.
USPC .......................................................... 396/52
(58) Field of Classification Search
USPC .......................................................... 396/52
See application file for complete search history.

(56) References Cited

U.S. PATENT DOCUMENTS

| 7,710,460 | B2 * | 5/2010 | Stavely ..................... | 348/208.99 |
| 8,014,659 | B2 * | 9/2011 | Nakayama ..................... | 396/55 |
| 8,228,387 | B2 * | 7/2012 | Huang ..................... | 348/208.11 |
| 2007/0091181 | A1 * | 4/2007 | Serikawa et al. .......... | 348/208.3 |
| 2007/0182825 | A1 * | 8/2007 | Nomura et al. .......... | 348/208.99 |
| 2009/0059372 | A1 * | 3/2009 | Kawauchi et al. ............ | 359/554 |

FOREIGN PATENT DOCUMENTS

| JP | P2000-75335 A | 3/2000 |
| JP | P2002-279700 A | 9/2002 |
| JP | P2010-204476 A | 9/2010 |

* cited by examiner

*Primary Examiner* — Clayton E LaBalle
*Assistant Examiner* — Linda B Smith
(74) *Attorney, Agent, or Firm* — Tracy M Heims; Apex Juris, pllc

(57) ABSTRACT

An optical image stabilizer of the present invention is mounted in a camera at an image size of a lens to assist an image capture device. The optical image stabilizer includes a base, a transverse frame, and a longitudinal frame. The base is provided with a pair of transverse rails and longitudinal reference magnets. The transverse frame is engaged with the transverse rails for reciprocation and is provided with a pair of longitudinal rails, transverse reference magnets and longitudinal reference magnets, wherein the longitudinal reference magnets are between the longitudinal rails. The longitudinal frame is engaged with the longitudinal rails for reciprocation and is provided with the image capture device, a transverse drive coil, and a longitudinal drive coil. The longitudinal drive coils are between the longitudinal rails and in association with the longitudinal reference magnets that the longitudinal frame may move smoothly.

8 Claims, 10 Drawing Sheets

OPTICAL IMAGE STABILIZER OF CAMERA

CROSS-REFERENCES TO RELATED APPLICATIONS

This non-provisional application claims priority under 35 U.S.C. §119(a) to Patent Application No(s). 100102188 filed in Taiwan, R.O.C. on Jan. 20, 2011, the entire contents of which are hereby incorporated by reference.

BACKGROUND OF THE INVENTION

1. Field of the Invention

The present invention relates generally to an image capture device of a camera, and more particularly to an optical image stabilizer of a camera.

2. Description of the Related Art

As shown in FIG. 1 and FIG. 2, a conventional optical image stabilizer 3, which is provided in a camera at an image side of a lens to assist an image capture device 4 (CCD or CMOS), includes:

A base 50 is mounted in the camera and has a pair of transverse rails 51.

A pair of transverse reference magnets 60a and a pair of longitudinal reference magnets 60b are mounted on the base 50.

A transverse frame 70a is mounted on the transverse rails 51 for reciprocation. The transverse frame 70a is provided with a pair of longitudinal rails 71, on which a longitudinal frame 70b is mounted for reciprocation. The image capture device 4 is mounted on the longitudinal frame 70b that the image capture device 4 may move along the longitudinal rails 71.

A transverse drive coil 80a and a longitudinal drive coil 80b are mounted on the longitudinal frame 70b and are in association with the transverse reference magnets 60a and the longitudinal reference magnets 60b are respectively. The transverse drive coil 80a and the longitudinal drive coil 80b may move the longitudinal frame 70b when a power supplies to the transverse drive coil 80a and the longitudinal drive coil 80b that the longitudinal frame 70b may move in a vertical direction and in a horizontal direction according to the currents supplying to the transverse drive coil 80a and the longitudinal drive coil 80b.

As shown in FIG. 3, when user operate the camera equipped with the optical image stabilizer 3, it will provide the transverse drive coil 80a and the longitudinal drive coil 80b predetermined currents when the camera detects shake, vibration, or tilt that the transverse drive coil 80a and the longitudinal drive coil 80b may generate magnetic fields on the transverse reference magnets 60a and the longitudinal reference magnets 60b to move the longitudinal frame 70b, with the image capture device 4 thereon, in predetermined directions to reduce the shake.

In such optical image stabilizer 3, as shown in FIG. 4, the longitudinal drive coil 80b is outside the longitudinal rails 71 that the magnetic forces Fr or Fa between the longitudinal drive coil 80b and the longitudinal reference magnets 60b may generate a torque Rr or Ra on the longitudinal frame 70b. It is easy to understand that the longitudinal frame 70b is like a lever at this moment, wherein the longitudinal rail 71 (the fulcrum) proximal to the longitudinal drive coil 80b has the torque Rr or Ra, and the other longitudinal rail 71 has a load fr or fa. For the same principle, it will provide a torque fu on the longitudinal rail 71 when the longitudinal drive coil 80b generates a force Fu to move the longitudinal frame 70b in the longitudinal direction, as shown in FIG. 5.

The torques and the loads on the longitudinal rails 71 may hinder the longitudinal frame 70b from movement that reduces the sensibility of the optical image stabilizer 3 in reduction of shake.

SUMMARY OF THE INVENTION

The primary objective of the present invention is to provide an optical image stabilizer with higher sensibility in reduction of shake.

According to the objective of the present invention, an optical image stabilizer, which is mounted in a camera at an image size of a lens to assist an image capture device, includes a base having two transverse rails; a pair of transverse reference magnets provided on the base and between the transverse rails; a pair of longitudinal reference magnets mounted on the base; a frame set, on which the image capture device is mounted, having a transverse frame, which has a pair of longitudinal rails, engaged with the transverse rails of the base for reciprocation along the transverse rails and a longitudinal frame, on which the image capture device is mounted, engaged with the longitudinal rails of the transverse frame for reciprocation along the longitudinal rails; a transverse drive coil mounted on the frame set and between the transverse rails and in association with the transverse reference magnets to move the transverse frame along the transverse rails of the base when a power is provided to the transverse drive coil; and a longitudinal drive coil mounted on the frame set and between the longitudinal rails and in association with the longitudinal reference magnets to move the longitudinal frame along the longitudinal rails of the transverse frame when a power is provided to the longitudinal drive coil.

DETAILED DESCRIPTION OF THE INVENTION

Figure 1:
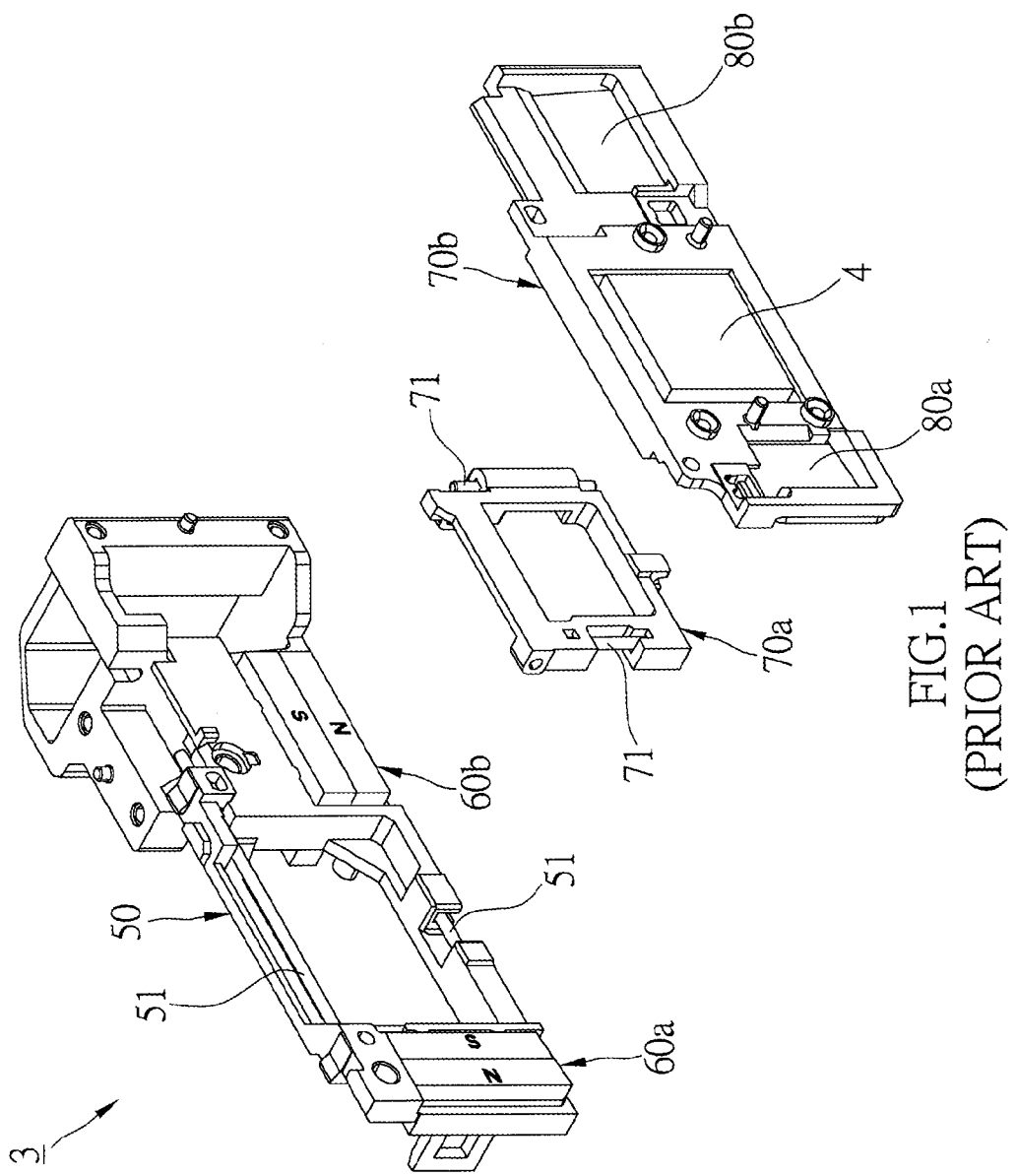
FIG. 1 is an exploded view of the conventional optical image stabilizer.
Figure 2:
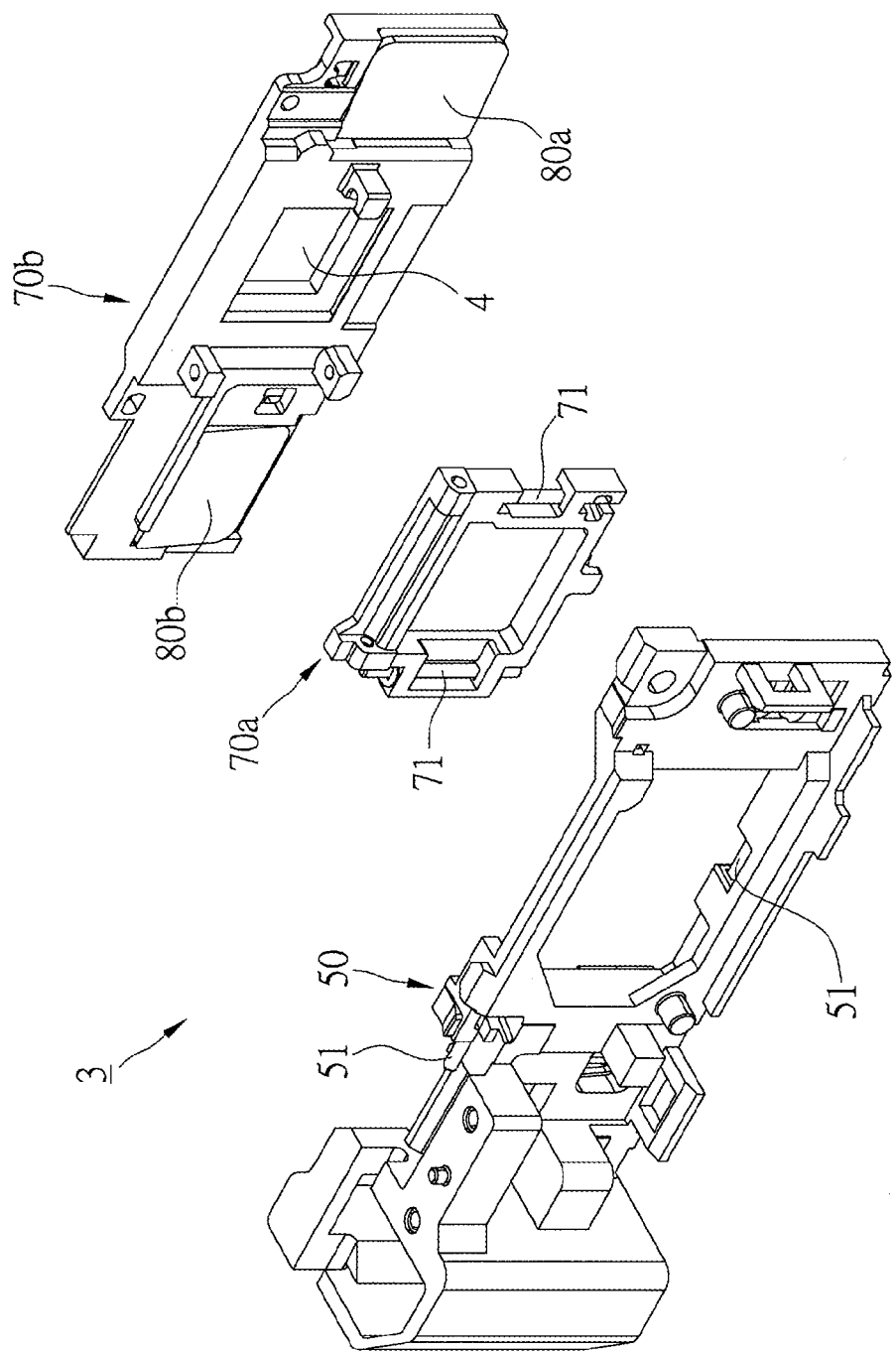
FIG. 2 is another exploded view of the conventional optical image stabilizer.
Figure 3:
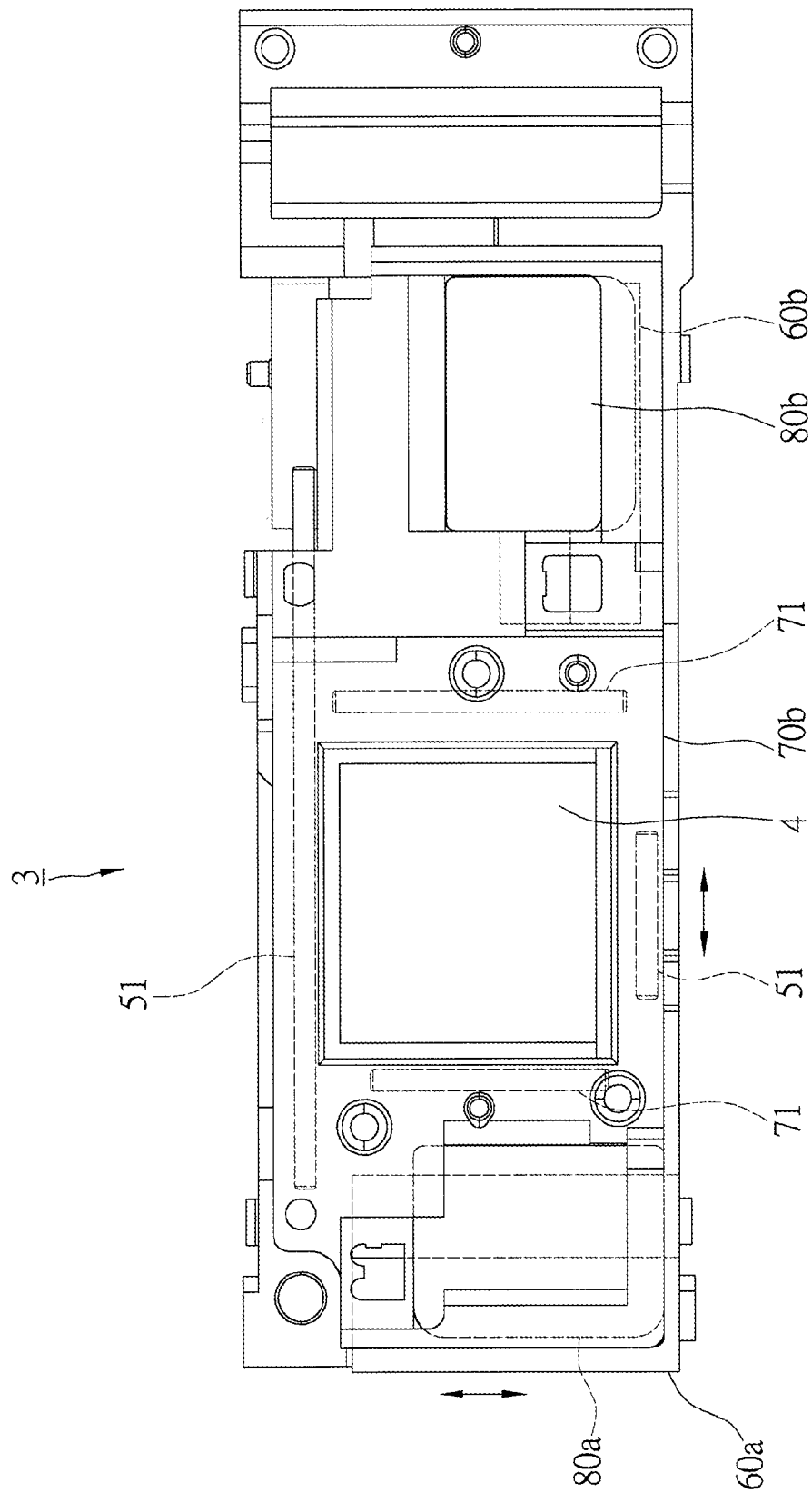
FIG. 3 and FIG. 5 are front views of the conventional optical image stabilizer, showing the movement of the longitudinal frame.
Figure 4:
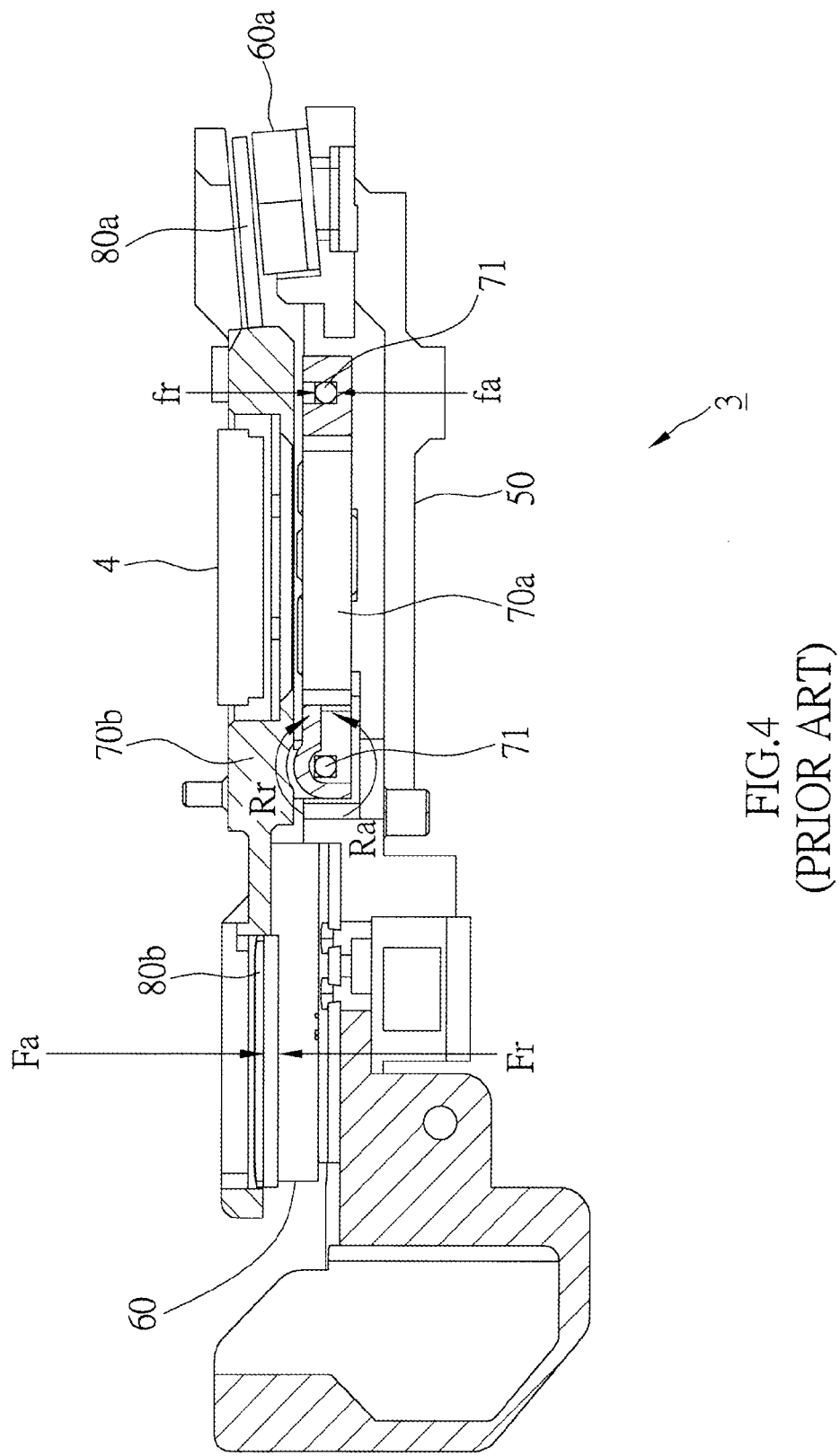
FIG. 4 is a sectional view of the conventional optical image stabilizer.
Figure 5:
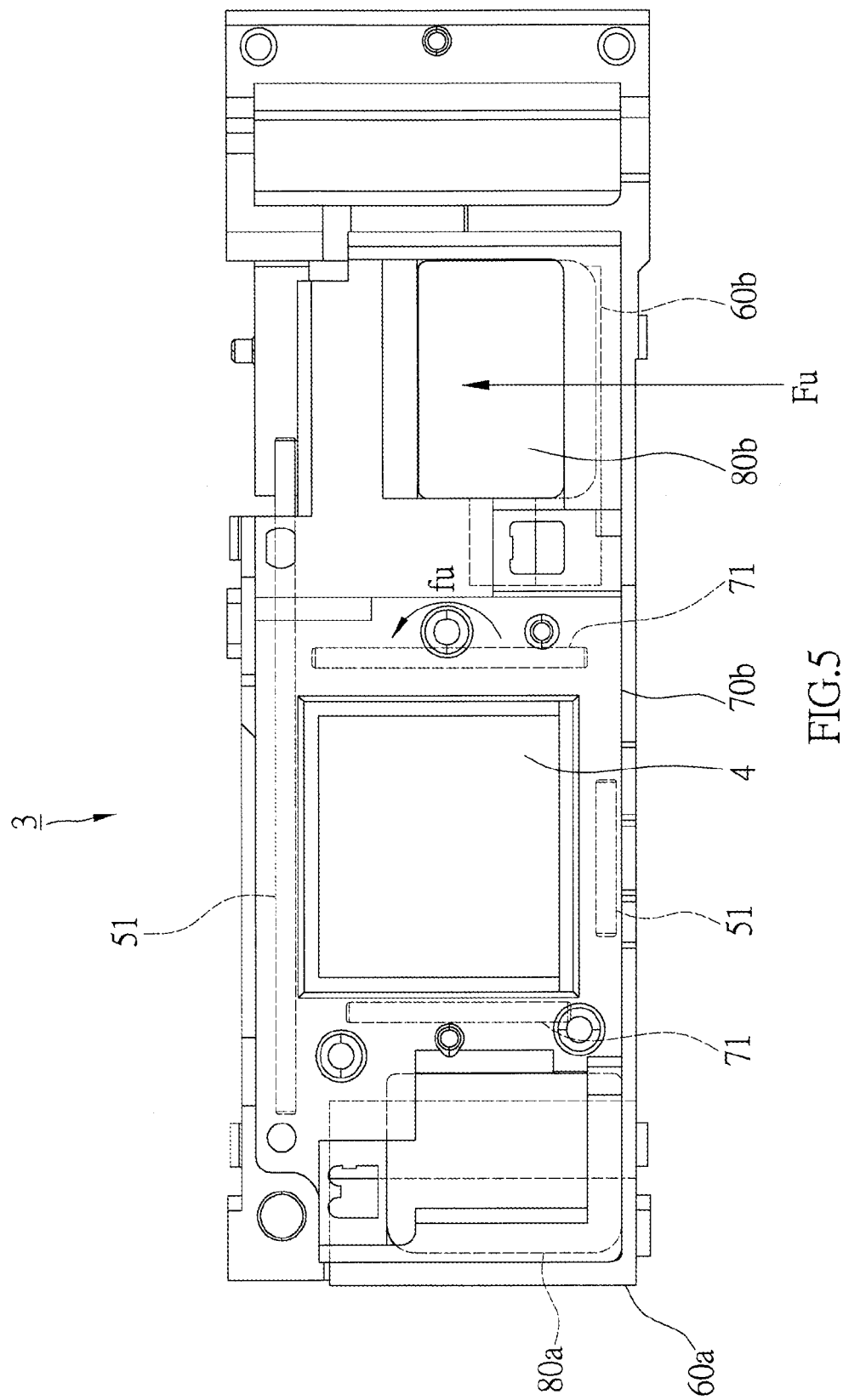
Figure 6:
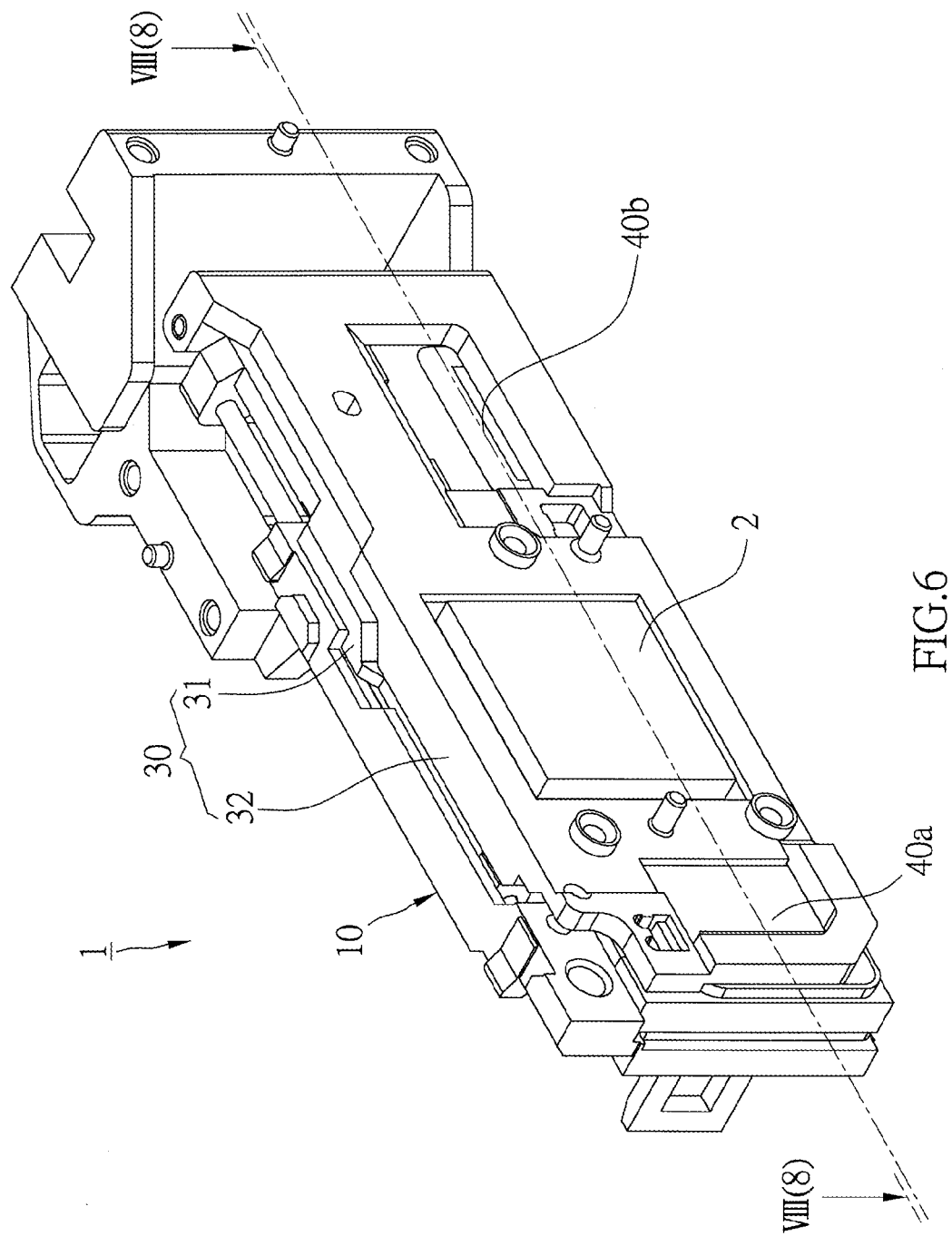
FIG. 6 is a perspective view of a preferred embodiment of the present invention.
Figure 7:
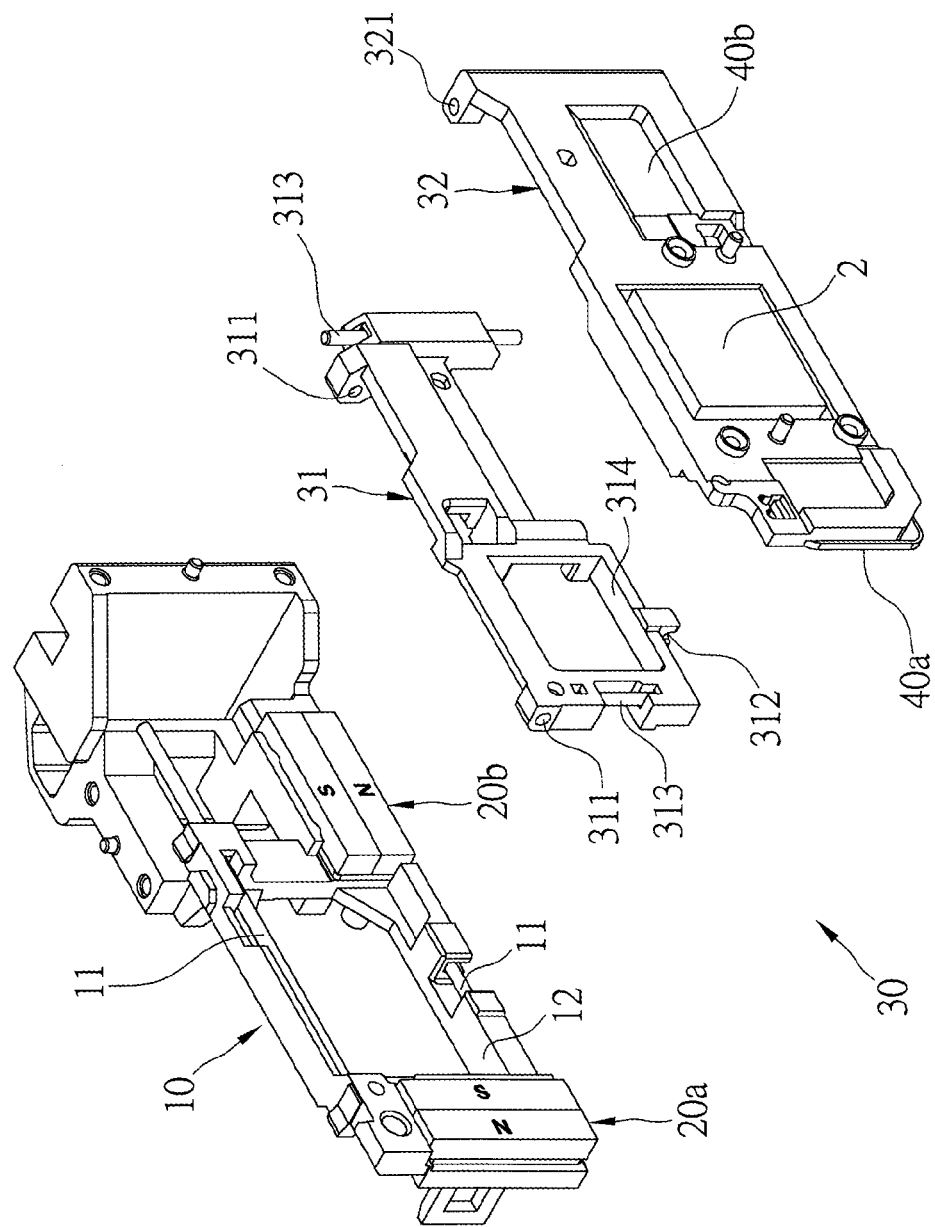
FIG. 7 is an exploded view of the preferred embodiment of the present invention.
Figure 8:
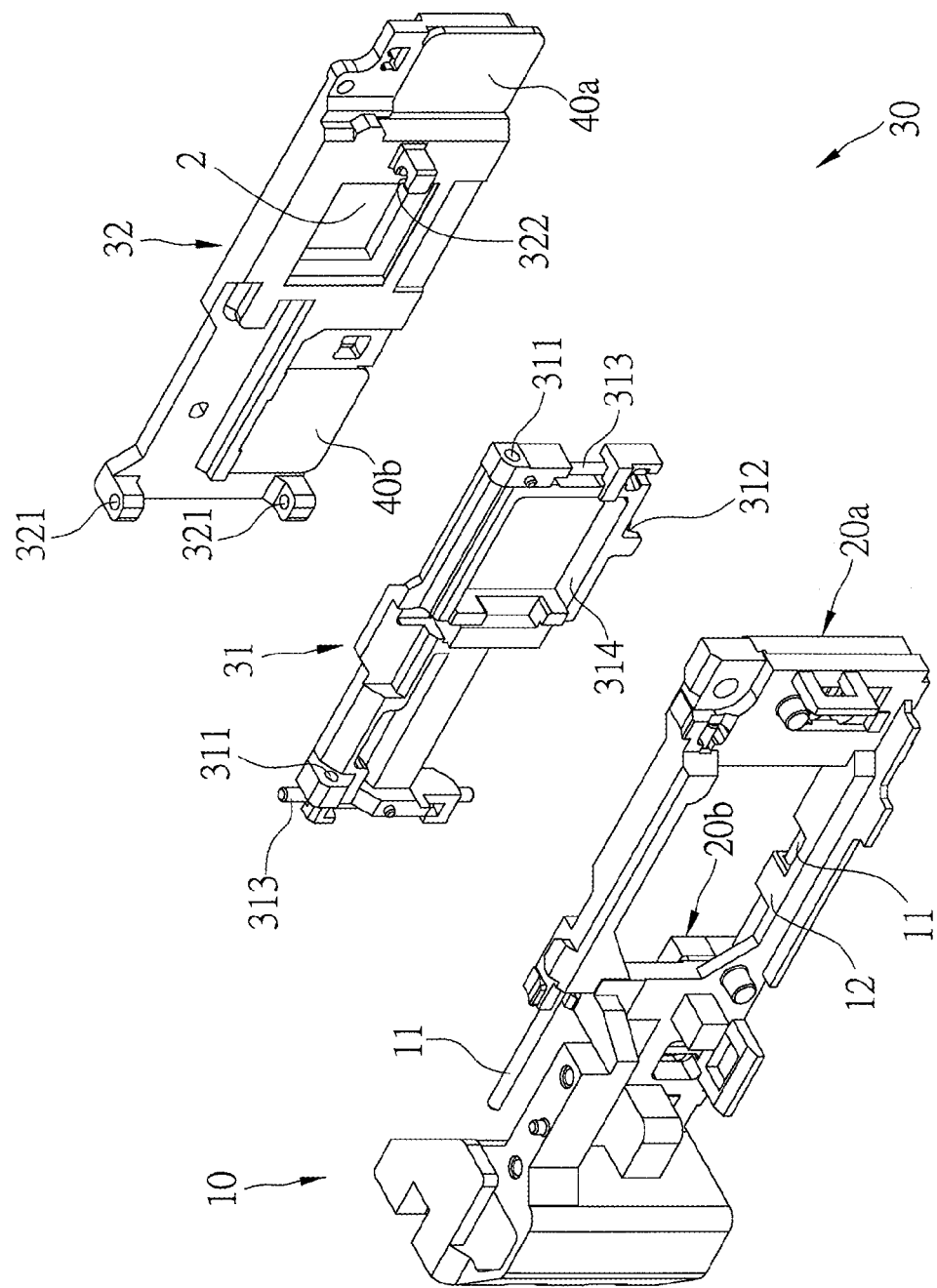
FIG. 8 is another exploded view of the preferred embodiment of the present invention.

As shown in FIG. 6 to FIG. 8, the preferred embodiment of the present invention provides an optical image stabilizer 1, which is mounted in a camera at an image size of a lens to assist an image capture device 2. The optical image stabilizer 1 includes:

A base 10, which is provided in the camera at the image side of the lens, has two transverse rails 11. In the present invention, the transverse rails 11 are two metal round shafts with smooth surfaces. The base 10 further has an opening 12 for the lens to image.

A pair of transverse reference magnets 20a and a pair of longitudinal reference magnets 20 are mounted on the base 10 and, more precisely, the transverse reference magnets 20a are mounted at a predetermined position between the transverse rails 11, and the longitudinal reference magnets 20 are between a pair of longitudinal rails 313 (they will be described in the following).

A frame set 30 includes a transverse frame 31 and a longitudinal frame 32.

The transverse frame 31 has a pair of through holes 311 and a slot 312. The transverse rail 11 passes through the through holes 311, and the slot 312 is engaged with the other transverse rail 11 that the transverse frame 31 may reciprocate along the transverse rails 11. The transverse frame 31 is provided with the longitudinal rails 313. In the present invention, the longitudinal rails 313 are two metal round shafts with smooth surfaces. The longitudinal rails 313 are mounted at opposite sides of the transverse frame 31. The transverse frame 31 further has an opening 314 for the lens to image.

The longitudinal frame 32 has a pair of through holes 321 and a slot 322. The longitudinal rail 313 passes through the through holes 321, and the slot 322 is engaged with the other transverse rail 313 that the longitudinal frame 32 may reciprocate along the longitudinal rails 313. The image capture device 2 is mounted on the longitudinal frame 32 and is behind the opening 314 of the transverse frame 31.

A transverse drive coil 40a is mounted on the frame set 30 in association with the transverse reference magnets 20a and between the transverse rails 11 and, more precisely, the transverse drive coil 40a is mounted on the longitudinal frame 32 at a predetermined position between the transverse rails 11. When a power is provided to the transverse drive coil 40a, it generates a magnetic field on the transverse reference magnets 20a that a magnetic force may move the longitudinal frame 32 in a transverse direction relative to the base 10 (along the transverse rails 11 of the base 10).

A longitudinal drive coil 40b is mounted on the frame set 30 in association with the longitudinal reference magnets 20b and between the longitudinal rails 313 and, more precisely, the longitudinal drive coil 40b is mounted on the longitudinal frame 32 at a predetermined position between the longitudinal rails 313. When a power is provided to the longitudinal drive coil 40b, it generates a magnetic field on the longitudinal reference magnets 20b that a magnetic force may move the longitudinal frame 32 in a longitudinal direction relative to the base 10 (along the longitudinal rails 313 of the transverse frame 31).

Figure 9:
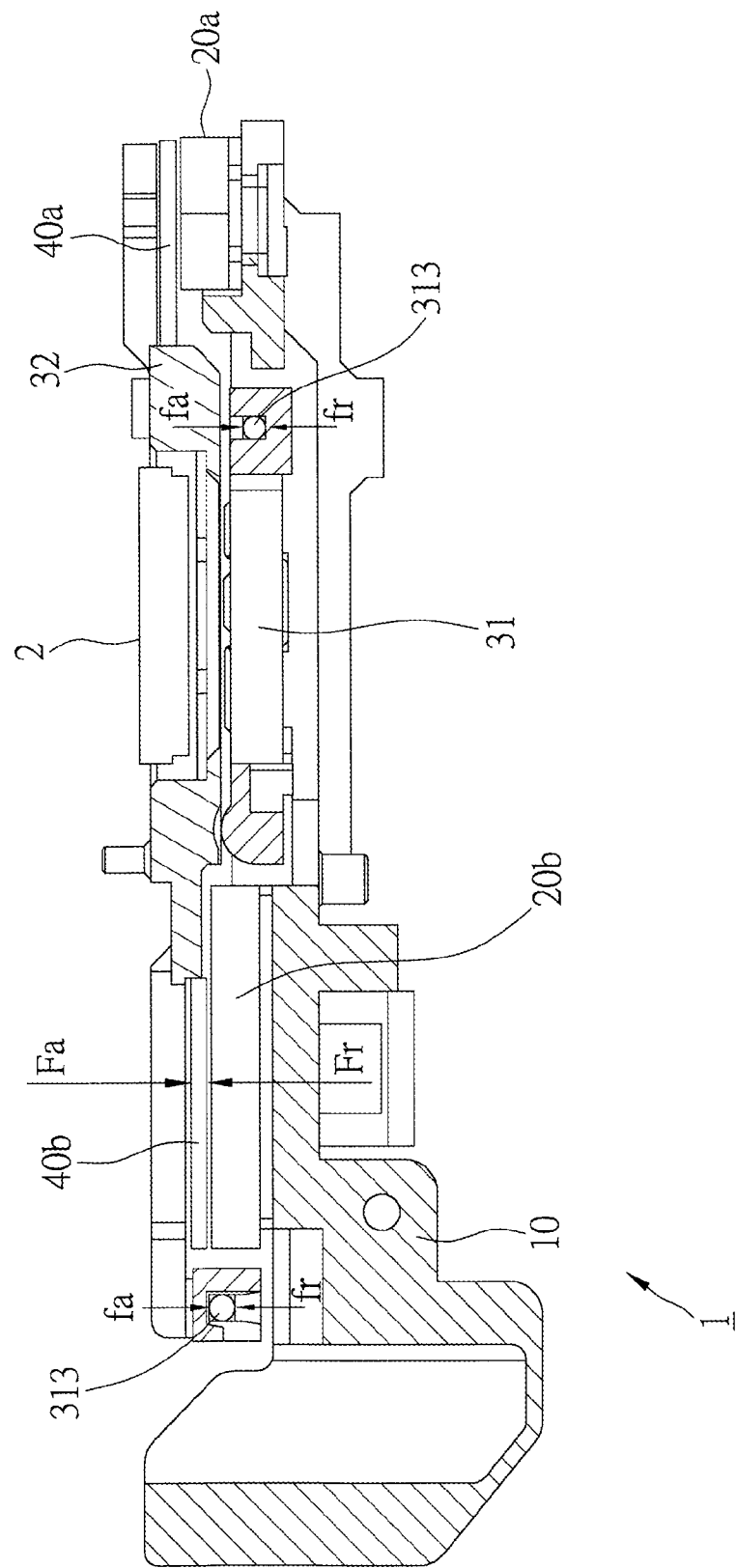
FIG. 9 is a sectional view along the VIII-VIII line of FIG. 6.
Figure 10:
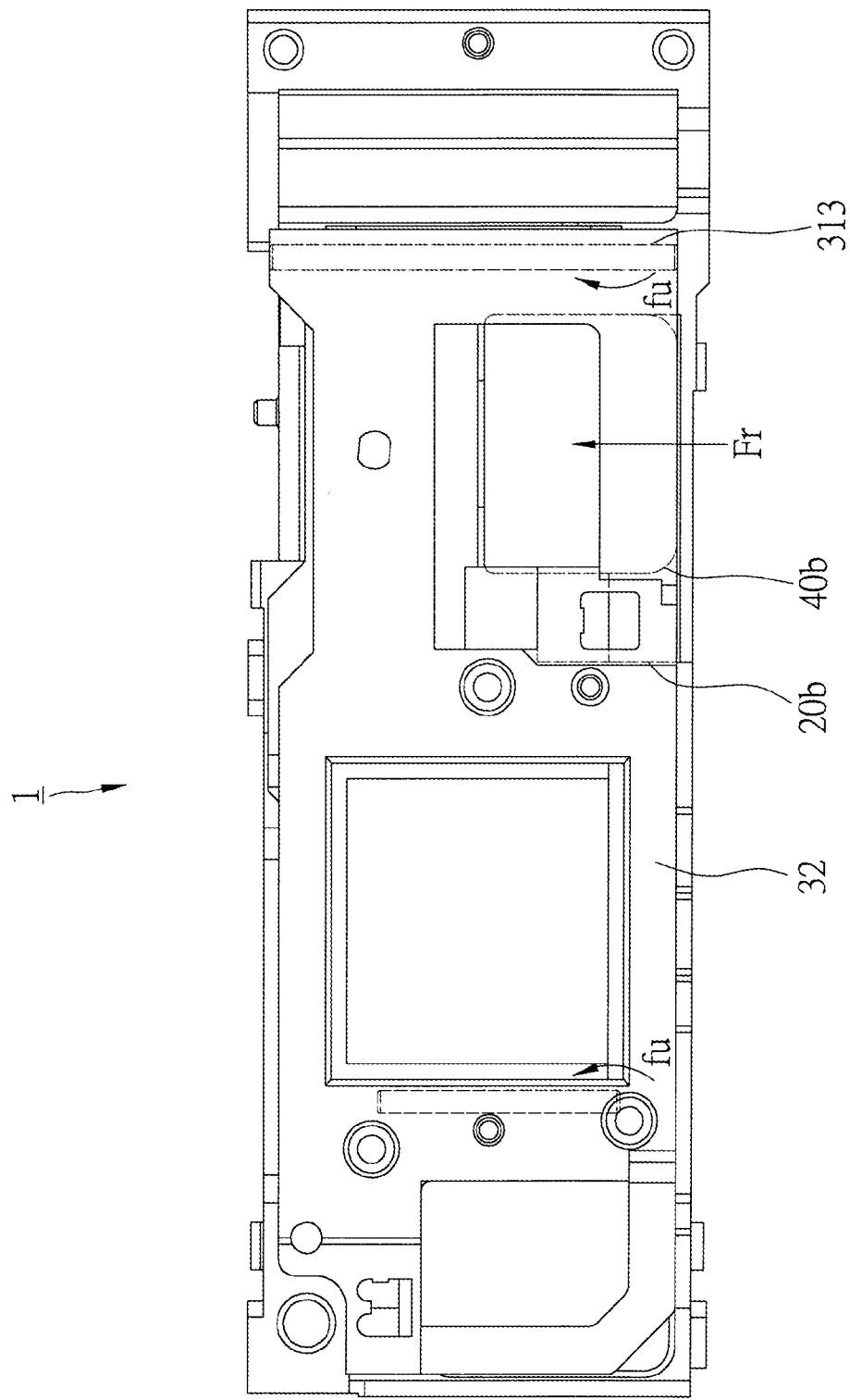
FIG. 10 is a front view of the preferred embodiment of the present invention.

As shown in FIG. 9, the longitudinal drive coil 40b on the longitudinal frame 32 and between the longitudinal rails 313 that the magnetic force Fa or Fr between the longitudinal drive coil 40b and the longitudinal reference magnets 20b will be equally distributed to the longitudinal rails 313 (as shown in the arrows fa and fr). It is easy to understand that no lever effect will be occurred on the longitudinal frame 32 of the present invention. In addition, when the longitudinal frame 32 is moved in the longitudinal direction, as shown in FIG. 10, the driving force Fu will be equally distributed to the longitudinal rails 313 as well.

In conclusion, the position of the longitudinal reference magnets 20b on the base 10 is between the longitudinal rails 313 that the longitudinal drive coil 40b on the longitudinal frame 32 has to be between the longitudinal rails 313 also. With such arrangement, the longitudinal frame 32 may have a smooth movement along the longitudinal rails 313 to have a high sensibility in reduction of shake.

The description above is a few preferred embodiments of the present invention. These equivalences of the present invention are still in the scope of claim construction of the present invention.

What is claimed is:

1. An optical image stabilizer, which is mounted in a camera at an image size of a lens to assist an image capture device, comprising:
   a base having two transverse rails;
   a pair of transverse reference magnets mounted on the base between the transverse rails;
   a pair of longitudinal reference magnets mounted on the base;
   a frame set, on which the image capture device is mounted, having a transverse frame, which has a pair of longitudinal rails, engaged with the transverse rails of the base for reciprocation along the transverse rails and a longitudinal frame, on which the image capture device is mounted, engaged with the longitudinal rails of the transverse frame for reciprocation along the longitudinal rails;
   a transverse drive coil mounted on the frame set between the transverse rails and beyond the longitudinal rails, and in association with the transverse reference magnets to move the transverse frame along the transverse rails of the base when a power is provided to the transverse drive coil;
   a longitudinal drive coil mounted on the frame set between the longitudinal rails and between the transverse rails, and in association with the longitudinal reference magnets to move the longitudinal frame along the longitudinal rails of the transverse frame when a power is provided to the longitudinal drive coil; and
   where a pair of magnetic forces Fa and Fr are created between said longitudinal reference magnets and said longitudinal drive coil and where said magnetic forces are equally distributed to said longitudinal rails such that a driving force Fu is equally distributed to said longitudinal rails.

2. The optical image stabilizer as defined in claim 1, wherein the transverse drive coil is mounted on the longitudinal frame of the frame set between the longitudinal rails and in association with the longitudinal reference magnets.

3. The optical image stabilizer as defined in claim 1, wherein the longitudinal drive coil is mounted on the longitudinal frame of the frame set between the longitudinal rails and in association with the transverse reference magnets.

4. The optical image stabilizer as defined in claim 1, wherein the transverse reference magnets are mounted on the base between the transverse rails, and the transverse drive coil is mounted on the frame set between the transverse rails and in association with the transverse reference magnets.

5. The optical image stabilizer as defined in claim 4, wherein the transverse drive coil is mounted on the longitudinal frame of the frame set between the transverse rails and in association with the transverse reference magnets.

6. The optical image stabilizer as defined in claim 1, wherein the transverse rails are two metal round shafts with smooth surfaces.

7. The optical image stabilizer as defined in claim 1, wherein the longitudinal rails are two metal round shafts with smooth surfaces.

8. The optical image stabilizer as defined in claim 1, wherein a distance between the longitudinal rails is greater than a distance between the transverse rails.

* * * * *